(12) United States Patent
Wu et al.

(10) Patent No.: US 12,267,618 B2
(45) Date of Patent: Apr. 1, 2025

(54) VIDEO TRANSMISSION METHOD, APPARATUS, AND SYSTEM

(71) Applicant: Huawei Technologies Co., Ltd., Shenzhen (CN)

(72) Inventors: Hao Wu, Nanjing (CN); Yongping Zhu, Nanjing (CN); Hongbo Liu, Nanjing (CN); Liang Wu, Nanjing (CN); Yong Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 181 days.

(21) Appl. No.: 18/145,111

(22) Filed: Dec. 22, 2022

(65) Prior Publication Data

US 2023/0124383 A1  Apr. 20, 2023

Related U.S. Application Data

(63) Continuation of application No. PCT/CN2021/101066, filed on Jun. 18, 2021.

(30) Foreign Application Priority Data

Jun. 23, 2020  (CN) .......................... 202010581695.2

(51) Int. Cl.
*H04N 5/44* (2011.01)
*H04N 5/38* (2006.01)

(52) U.S. Cl.
CPC ............. *H04N 5/4448* (2013.01); *H04N 5/38* (2013.01)

(58) Field of Classification Search
CPC ...... H04N 5/4448; H04N 5/38; H04L 65/613; H04L 65/756; H04L 65/80; H04L 65/612
See application file for complete search history.

(56) References Cited

U.S. PATENT DOCUMENTS

| | | | | |
|---|---|---|---|---|
| 7,719,540 B2* | 5/2010 | Piazza | ................... | G06T 15/005 345/557 |
| 7,822,119 B2* | 10/2010 | Boon | ................... | H04N 19/593 375/240.12 |
| 7,830,959 B2* | 11/2010 | Park | ..................... | H04N 19/423 375/240.12 |
| 2002/0071434 A1* | 6/2002 | Furukawa | ............. | H04L 69/161 370/465 |

(Continued)

FOREIGN PATENT DOCUMENTS

| CN | 107872666 A | 4/2018 |
|---|---|---|
| CN | 108322727 A | 7/2018 |

(Continued)

*Primary Examiner* — Michael B. Pierorazio
(74) *Attorney, Agent, or Firm* — Conley Rose, P.C.

(57) ABSTRACT

A video transmission method includes that a terminal sends first field of view information to a server through a first link based on a first period. The server receives the first field of view information from the terminal through the first link based on the first period. After determining, based on a second period, that the first field of view information is latest field of view information, the server obtains data of a first frame of image corresponding to the first field of view information, and sends the data of the first frame of image to the terminal through a second link. The terminal receives the data of the first frame of image from the server through the second link based on the second period.

20 Claims, 10 Drawing Sheets

(56) References Cited

U.S. PATENT DOCUMENTS

| | | | | |
|---|---|---|---|---|
| 2003/0123557 | A1* | 7/2003 | De With | H04N 19/60 375/E7.242 |
| 2003/0159139 | A1* | 8/2003 | Candelore | H04N 21/4347 380/201 |
| 2004/0003178 | A1* | 1/2004 | Magoshi | G06F 12/0875 711/217 |
| 2004/0010614 | A1* | 1/2004 | Mukherjee | H04N 21/234327 348/E7.063 |
| 2004/0022543 | A1* | 2/2004 | Hosking | H04B 10/0799 398/135 |
| 2005/0036543 | A1* | 2/2005 | Vetro | H04N 19/156 375/E7.134 |
| 2005/0036547 | A1* | 2/2005 | Vetro | H04N 21/21805 375/E7.134 |
| 2005/0076136 | A1* | 4/2005 | Cho | H04L 65/70 709/231 |
| 2005/0219253 | A1* | 10/2005 | Piazza | G06T 15/005 345/557 |
| 2007/0154065 | A1* | 7/2007 | Kellerer | H04N 21/2662 375/E7.181 |
| 2008/0031329 | A1* | 2/2008 | Iwata | H04N 19/593 375/E7.176 |
| 2008/0094419 | A1* | 4/2008 | Leigh | G09G 3/007 382/300 |
| 2008/0123750 | A1* | 5/2008 | Bronstein | H04N 19/436 375/240.24 |
| 2008/0205856 | A1* | 8/2008 | Kim | H04N 21/44004 386/290 |
| 2009/0094658 | A1* | 4/2009 | Kobayashi | H04N 21/4325 725/118 |
| 2010/0091836 | A1* | 4/2010 | Jia | H04N 19/86 375/240.01 |
| 2010/0091880 | A1* | 4/2010 | Jia | H04N 19/44 375/240.25 |
| 2010/0097250 | A1* | 4/2010 | Demircin | H04N 19/61 341/107 |
| 2010/0098155 | A1* | 4/2010 | Demircin | H03M 7/4006 375/E7.126 |
| 2010/0118945 | A1* | 5/2010 | Wada | H04N 19/70 375/E7.246 |
| 2010/0128797 | A1* | 5/2010 | Dey | H04N 19/61 375/240.24 |
| 2010/0189603 | A1* | 7/2010 | Glazier | G01N 33/54373 422/82.05 |
| 2010/0195922 | A1* | 8/2010 | Amano | H04N 19/176 382/233 |
| 2010/0246683 | A1* | 9/2010 | Webb | H04N 19/895 375/E7.123 |
| 2010/0260263 | A1* | 10/2010 | Kotaka | H04N 19/154 375/E7.243 |
| 2010/0296744 | A1* | 11/2010 | Boon | H04N 19/593 382/233 |
| 2010/0321428 | A1* | 12/2010 | Saito | G06K 15/102 347/9 |
| 2011/0182523 | A1* | 7/2011 | Kim | H04N 19/593 382/233 |
| 2011/0267951 | A1* | 11/2011 | Stanwood | H04L 47/2408 370/235 |
| 2012/0013748 | A1* | 1/2012 | Stanwood | H04L 47/2408 348/192 |
| 2012/0151540 | A1* | 6/2012 | Stanwood | H04L 47/2416 725/109 |
| 2013/0086279 | A1* | 4/2013 | Archer | H04L 65/80 709/233 |
| 2013/0089107 | A1* | 4/2013 | Li | H04L 47/30 370/412 |
| 2013/0216144 | A1* | 8/2013 | Robinson | H04N 19/17 382/233 |
| 2018/0077209 | A1* | 3/2018 | So | G09G 3/20 |
| 2018/0184000 | A1* | 6/2018 | Lee | H04N 23/698 |
| 2018/0270531 | A1* | 9/2018 | Ye | H04L 43/16 |
| 2018/0348861 | A1* | 12/2018 | Uscinski | G06V 20/20 |
| 2020/0145636 | A1* | 5/2020 | Jang | H04L 65/762 |
| 2020/0154092 | A1* | 5/2020 | Jang | H04L 65/613 |

FOREIGN PATENT DOCUMENTS

| | | |
|---|---|---|
| CN | 108521436 A | 9/2018 |
| CN | 108702522 A | 10/2018 |
| CN | 109219810 A | 1/2019 |
| CN | 109923867 A | 6/2019 |
| CN | 209805837 U | 12/2019 |
| CN | 110868581 A | 3/2020 |
| EP | 3419293 A1 | 12/2018 |
| GB | 2567136 A | 4/2019 |

* cited by examiner

VIDEO TRANSMISSION METHOD, APPARATUS, AND SYSTEM

CROSS-REFERENCE TO RELATED APPLICATIONS

This is a continuation of International Patent Application No. PCT/CN2021/101066 filed on Jun. 18, 2021, which claims priority to Chinese Patent Application No. 202010581695.2 filed on Jun. 23, 2020. The disclosures of the aforementioned applications are hereby incorporated by reference in their entireties.

TECHNICAL FIELD

This disclosure relates to the field of virtual reality (VR) technologies, and in particular, to a video transmission method, an apparatus, and a system.

BACKGROUND

In a transmission process of a VR video, one VR panoramic video may be split into one field of view (FoV) stream and one panoramic stream for transmission, where the FoV stream is video data of a current field of view of a user. For example, one 8K VR panoramic video may be split into one 4K FoV stream and one 4K panoramic stream.

Usually, a transmission procedure of a FoV stream of a VR video is shown in FIG. 1. A specific process includes the following steps.

Step 1. A terminal requests video data of a FoV1 from a server. In response to the request, the server starts to transmit the video data of the FoV1. After receiving the video data of the FoV1, the terminal decodes and displays the data.

FoV data requested by the terminal from the server is usually at a granularity of a second-level fragment (30 to 60 frames).

Step 2. The terminal perceives a change of a user's field of view (for example, the user turns the head), to be specific, detects that a FoV of the user changes from the FoV1 to a FoV2.

Step 3. The terminal stops decoding and displaying the video data of the FoV1.

Step 4. The terminal notifies the server to stop transmitting the video data of the FoV1. In response to the notification, the server stops transmitting the video data of the FoV1.

In addition, the terminal discards received video data of the FoV1, and the discarded FoV data of a previous field of view buffered by the terminal is redundant data.

Step 5. The terminal requests video data of the FoV2 from the server. In response to the request, the server starts to transmit the video data of the FoV2. After receiving the video data of the FoV2, the terminal decodes and displays the data.

In this method, due to a specific delay in network transmission, when the FoV of the user changes, the server cannot receive in time a command sent by the terminal for stopping sending the video data of the FoV1. Within the delay, the server may continue to transmit the video data of the FoV1, and this results in generation of a large amount of redundant data. However, after the server receives signaling indicating that the terminal requests the video data of the FoV2, to compensate for time consumed by transmission of the redundant data of the FoV1 and a signaling transmission delay, the server increases a transmission bandwidth, to increase a transmission burst bandwidth, causing frame freezing or low-definition video display, and affecting user experience.

SUMMARY

Embodiments of this disclosure provide a video transmission method, an apparatus, and a system, to reduce generation of redundant data in a VR video transmission process and reduce a transmission burst bandwidth. In addition, a motion-to-hires latency (MTHR) can be reduced.

To achieve the foregoing objectives, the following technical solutions are used in embodiments of this disclosure.

According to a first aspect, a video transmission method is provided. The method may be performed by a server, or may be performed by a component of the server, for example, a processor, a circuit, a chip, or a chip system of the server. In this disclosure, an example in which the server performs the method is used for description. The method includes the following. The server receives first field of view information from a terminal through a first link based on a first period, determines, based on a second period, that the first field of view information is latest field of view information, and then obtains data of a first frame of image corresponding to the first field of view information, and sends the data of the first frame of image to the terminal through a second link.

Based on this solution, the server obtains, based on the second period, latest field of view information reported by the terminal and data of a frame of image corresponding to the latest field of view information, that is, time for generating and sending image data on the server side is independently controlled by the server. In addition, each time the server generates and sends data of a frame of image corresponding to latest field of view information, a transmission granularity can be reduced to an image frame level, to more precisely control processing and sending time of each frame of image, reduce generation and transmission of redundant data, and further reduce a transmission burst bandwidth. In addition, the terminal reports the field of view information through the first link, and the server sends the image data through the second link. Therefore, an independent link is for reporting the field of view information, and sending and receiving of the image data are not affected. When image data corresponding to new field of view information is transmitted, a transmission link does not need to be re-established, to reduce an MTHR.

In some possible designs, the second period is determined based on a frame rate of a video, and the first frame of image belongs to the video. Based on the possible designs, the second period may be a display interval between two adjacent frames of images. Therefore, frame skipping usually does not occur when the server sends, based on the second period, the frame of image corresponding to the latest field of view information. In this way, user experience is not affected.

In some possible designs, that the server determines, based on a second period, that the first field of view information is latest field of view information includes the following. The server determines, based on a clock of the server and the second period, that the first field of view information is the latest field of view information. Based on the possible designs, time for generating and sending image data on the server side can be independently controlled by the server, and is not affected by transmission of field of view information.

In some possible designs, the video transmission method further includes that the server receives first information from the terminal, where the first information indicates a first reference moment for sending image data to the terminal, and the first reference moment is a moment at which the server sends the image data to the terminal for the first time. Based on the possible designs, the server may determine the moment at which the image data is sent to the terminal for the first time, so that the image data may be subsequently sent based on the second period by using the first reference moment as a reference moment.

In some possible designs, the video transmission method further includes that the server receives second information from the terminal, where the second information indicates to send data of a second frame of image at a second reference moment, the second frame of image is a next frame of image to be received by the terminal, the second reference moment is later than a first moment or the second reference moment is earlier than the first moment, and the first moment is a moment at which the second frame of image is sent based on the second period that uses the first reference moment as a start moment.

In some possible designs, the second information includes the second reference moment and/or a frame number of the second frame of image.

Based on the foregoing two possible designs, the server may dynamically adjust, in real time according to an indication of the terminal, time for sending the image data by the server. This can effectively alleviate a problem of transmission instability caused by a network condition change, especially a transmission delay jitter, improve transmission stability, and improve user experience.

According to a second aspect, a video transmission method is provided. The method may be performed by a terminal, or may be performed by a component of the terminal, for example, a processor, a circuit, a chip, or a chip system of the terminal. In this disclosure, an example in which the terminal performs the method is used for description. The method includes that the terminal sends first field of view information to a server through a first link based on a first period, and receive, from the server through a second link based on a second period, data of a first frame of image that corresponds to the first field of view information.

Based on this solution, the server sends, to the terminal based on the second period, data of a frame of image corresponding to latest field of view information reported by the terminal, that is, time for generating and sending image data on the server side is independently controlled by the server. In addition, each time the server generates and sends data of a frame of image corresponding to latest field of view information, a transmission granularity can be reduced to an image frame level, to more precisely control processing and sending time of each frame of image, reduce generation and transmission of redundant data, and further reduce a transmission burst bandwidth. In addition, the terminal reports the field of view information through the first link, and the server sends the image data through the second link. Therefore, an independent link is for reporting the field of view information, and sending and receiving of the image data are not affected. When image data corresponding to new field of view information is transmitted, a transmission link does not need to be re-established, to reduce an MTHR.

In some possible designs, that the terminal sends first field of view information to a server through a first link based on a first period includes that the terminal sends the first field of view information to the server through the first link based on a clock of the terminal and the first period. Based on the possible designs, time for reporting field of view information can be independently controlled by the terminal, and is not affected by image data transmission, to improve sensitivity of the terminal.

In some possible designs, the video transmission method further includes that the terminal sends first information to the server, where the first information indicates a first reference moment for sending image data to the terminal, and the first reference moment is a moment at which the server sends the image data to the terminal for the first time. Based on the possible designs, the server may determine the moment at which the image data is sent to the terminal for the first time, so that the image data may be subsequently sent based on the second period by using the first reference moment as a reference moment.

In some possible designs, the video transmission method further includes that the terminal sends second information to the server when a quantity of frames of an image buffered by the terminal is greater than or equal to a first threshold, where the second information indicates to send data of a second frame of image at a second reference moment, the second reference moment is later than a first moment, the first moment is a moment at which the second frame of image is sent based on the second period that uses the first reference moment as a start moment, and the second frame of image is a next frame of image to be received by the terminal.

In some possible designs, the video transmission method further includes that the terminal sends second information to the server when a quantity of frames of an image buffered by the terminal is less than or equal to a second threshold, where the second information indicates to send data of a second frame of image at a second reference moment, the second reference moment is earlier than a first moment, the first moment is a moment at which the second frame of image is sent based on the second period that uses the first reference moment as a start moment, and the second frame of image is a next frame of image to be received by the terminal.

In some possible designs, the second information includes the second reference moment and/or a frame number of the second frame of image.

Based on the foregoing three possible designs, the server can dynamically adjust, in real time according to an indication of the terminal, time for sending image data by the server. On one hand, the terminal may be prevented from buffering an excessively large amount of image data, and a redundant data amount in a transmission process can be reduced, to reduce a transmission burst bandwidth when a user's field of view changes (for example, the user turns the head). On the other hand, this can effectively alleviate a problem of transmission instability caused by a network condition change, especially a transmission delay jitter, improve transmission stability, and improve user experience.

According to a third aspect, a communication apparatus is provided, and is configured to implement either of the methods in the foregoing aspects. In some implementations, the communication apparatus may be the server in the first aspect, an apparatus including the server, or an apparatus included in the server, for example, a chip. Alternatively, in some other implementations, the communication apparatus may be the terminal in the second aspect, an apparatus including the terminal, or an apparatus included in the terminal. The communication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

According to a fourth aspect, a communication apparatus is provided, and includes a memory and at least one processor. The memory is configured to store computer instructions. When the processor executes the instructions, the communication apparatus is enabled to perform the method according to either of the foregoing aspects. The communication apparatus may be the server in the first aspect, an apparatus including the server, or an apparatus included in the server, for example, a chip. Alternatively, in some other implementations, the communication apparatus may be the terminal in the second aspect, an apparatus including the terminal, or an apparatus included in the terminal.

According to a fifth aspect, a communication apparatus is provided, including an interface circuit and at least one processor. The interface circuit may be a code/data read/write interface circuit, and the interface circuit is configured to receive computer-executable instructions (where the computer-executable instructions are stored in a memory, and may be directly read from the memory, or may be read via another component), and transmit the computer-executable instructions to the processor. The processor is configured to run the computer-executable instructions to perform the method according to either of the foregoing aspects. The communication apparatus may be the server in the first aspect, an apparatus including the server, or an apparatus included in the server, for example, a chip. Alternatively, in some other implementations, the communication apparatus may be the terminal in the second aspect, an apparatus including the terminal, or an apparatus included in the terminal.

According to a sixth aspect, a communication apparatus is provided, and includes a processor. The processor is coupled to a memory, and is configured to perform, after reading instructions in the memory, the method according to either of the foregoing aspects according to the instructions. The communication apparatus may be the server in the first aspect, an apparatus including the server, or an apparatus included in the server, for example, a chip. Alternatively, in some other implementations, the communication apparatus may be the terminal in the second aspect, an apparatus including the terminal, or an apparatus included in the terminal.

According to a seventh aspect, a computer-readable storage medium is provided. The computer-readable storage medium stores instructions. When the instructions are executed on a communication apparatus, the communication apparatus is enabled to perform the method according to either of the foregoing aspects. The communication apparatus may be the server in the first aspect, an apparatus including the server, or an apparatus included in the server, for example, a chip. Alternatively, in some other implementations, the communication apparatus may be the terminal in the second aspect, an apparatus including the terminal, or an apparatus included in the terminal.

According to an eighth aspect, a computer program product including instructions is provided. When the computer program product runs on a communication apparatus, the communication apparatus is enabled to perform the method according to either of the foregoing aspects. The communication apparatus may be the server in the first aspect, an apparatus including the server, or an apparatus included in the server, for example, a chip. Alternatively, in some other implementations, the communication apparatus may be the terminal in the second aspect, an apparatus including the terminal, or an apparatus included in the terminal.

According to a ninth aspect, a communication apparatus (where for example, the communication apparatus may be a chip or a chip system) is provided. The communication apparatus includes at least one processor configured to implement a function in either of the foregoing aspects. In some possible designs, the communication apparatus further includes a memory. The memory is configured to store necessary program instructions and/or data. When the communication apparatus is a chip system, the communication apparatus may include a chip, or may include a chip and another discrete component.

For technical effects brought by any one of the designs of the third aspect to the ninth aspect, refer to technical effects brought by different designs of the first aspect or the second aspect. Details are not described herein again.

According to a tenth aspect, a communication system is provided. The communication system includes the server according to the foregoing aspects and the terminal according to the foregoing aspects.

DESCRIPTION OF EMBODIMENTS

Figure 1:
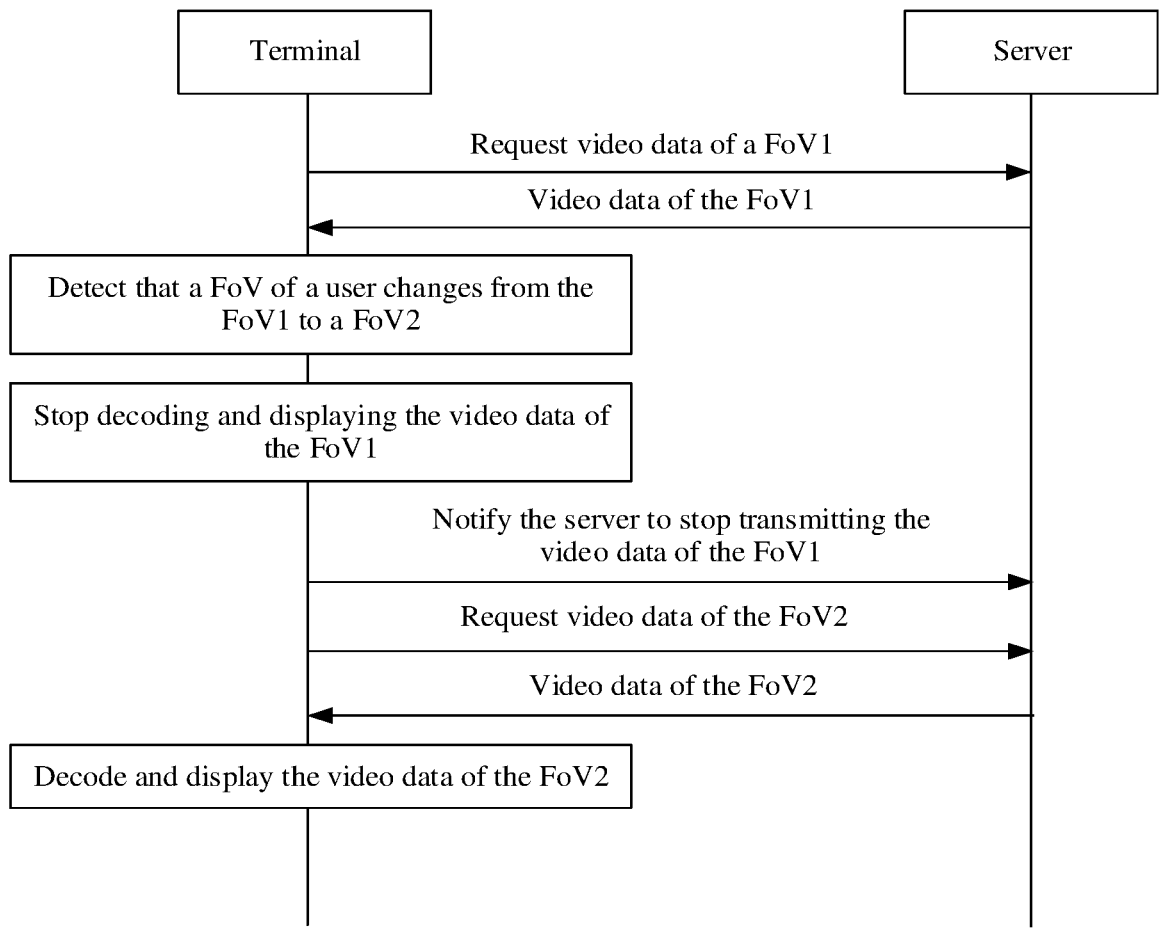
FIG. 1 is a schematic flowchart of existing VR video transmission.

For ease of understanding of the technical solutions in embodiments of this disclosure, the technologies related to this disclosure are first briefly described as follows.

1. VR FoV Technology:

4K VR videos are equivalent only to videos on 240P televisions in users' views, which cannot meet basic experience requirements of users. To achieve good VR experience, 8K resolution is a basic condition for entry-level VR. However, mainstream VR terminals, especially all-in-one headsets, have only 4K decoding capabilities and cannot support 8K VR video decoding and display. In addition, a transmission bandwidth of 8K VR videos is generally over 100 megabits per second (Mbps), which exceeds transmission capabilities of mainstream home broadband and Wi-Fi.

To enable a VR terminal to decode and display an 8K VR video, a mainstream processing manner in the industry is using a VR FoV technology.

Different from a conventional plane video, in a watching process, a user of a VR video can see only a video of ¼ or even a smaller area. Therefore, in a process of watching the VR video, the user does not need to decode and display an entire 8K image, and only needs to decode and display an image in a current FoV of the user in real time. However, to ensure that the user can always see the image during a head turning process and ensure that the user is not dizzy during video watching, a 4K panoramic stream needs to be provided as a background image. According to this solution, one 8K VR panoramic video is split into one 4K FoV stream and one 4K panoramic stream. This solution may be understood as the VR FoV technology.

The VR FoV technology not only resolves the problem that VR terminals can decode only 4K videos, but also reduces a transmission bandwidth to less than 80 Mbps, meeting the transmission capability limitations of home broadband and Wi-Fi.

2. MTHR:

The MTHR is duration from a moment at which a terminal requests 4K FoV data corresponding to a latest FoV from a server to a moment at which the terminal device receives, decodes, and displays the 4K FoV data corresponding to the latest FoV.

The following describes the technical solutions in embodiments of this disclosure with reference to the accompanying drawings in embodiments of this disclosure. In the descriptions of this disclosure, unless otherwise specified, "/" indicates an "or" relationship between associated objects. For example, A/B may indicate A or B. In this disclosure, "and/or" describes only an association relationship between associated objects and indicates that three relationships may exist. For example, A and/or B may indicate the following three cases: only A exists, both A and B exist, and only B exists, where A or B may be singular or plural. In addition, in the descriptions of this disclosure, unless otherwise specified, "at least one" means one or more, and "a plurality of" means two or more. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this disclosure, terms such as first and second are used in embodiments of this disclosure to distinguish between same items or similar items that provide basically same functions or purposes. A person skilled in the art may understand that the terms such as "first" and "second" do not limit a quantity or an execution sequence, and that the terms such as "first" and "second" do not indicate a definite difference.

Figure 2:
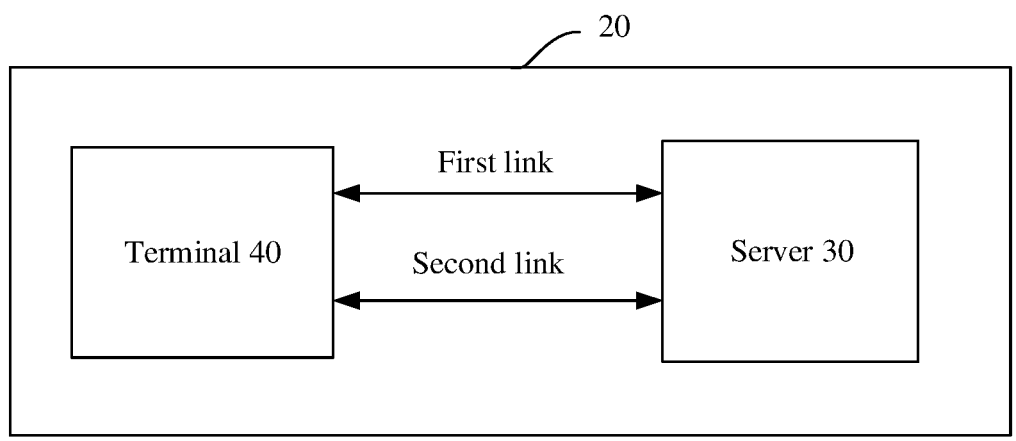
FIG. 2 is a schematic diagram of a structure of a communication system according to an embodiment of this disclosure.

FIG. 2 shows a communication system 20 according to an embodiment of this disclosure. The communication system 20 includes a server 30 and a terminal 40.

There are two links between the server 30 and the terminal 40: a first link and a second link. The first link is for transmitting field of view information, and the second link is for transmitting image data corresponding to the field of view information.

In this embodiment of this disclosure, the terminal 40 sends first field of view information to the server 30 through the first link based on a first period. Correspondingly, the server 30 receives the first field of view information from the terminal through the first link based on the first period. After determining, based on a second period, that the first field of view information is latest field of view information, the server 30 obtains data of a first frame of image corresponding to the first field of view information, and sends the data of the first frame of image to the terminal 40 through the second link. Correspondingly, the terminal 40 receives the data of the first frame of image from the server 30 through the second link based on the second period. Detailed descriptions of the solution are to be described in subsequent embodiments, and are not described herein.

It should be noted that in this embodiment of this disclosure, the "image" may also be referred to as a "FoV frame" or a "FoV image frame", and the names may be replaced with each other. This is not limited in this embodiment of this disclosure.

In the solution in this embodiment of this disclosure, the server obtains, based on the second period, the latest field of view information reported by the terminal and FoV image data corresponding to the latest field of view information, that is, time for generating and sending the FoV image data on the server side is independently controlled by the server. In addition, each time the server generates and sends data of a frame of image corresponding to latest field of view information, a transmission granularity can be reduced to an image frame level in this embodiment, to more precisely control processing and sending time of each frame of image, reduce generation and transmission of redundant data, and further reduce a transmission burst bandwidth. In addition, the terminal reports the field of view information through the first link, and the server sends the image data through the second link. Therefore, an independent link is for reporting the field of view information, and sending and receiving of the image data are not affected. When image data corresponding to new field of view information is transmitted, a transmission link does not need to be re-established, to reduce an MTHR.

Optionally, the server 30 in this embodiment of this disclosure may be a VR media server. The server 30 may be deployed in a mobile edge computing (MEC) environment. MEC is a technology for deeply integrating a mobile network and an internet service based on a 5th generation (5G) evolution architecture. The 3rd Generation Partnership Project (3GPP) initiated MEC-related projects in both a radio access network (RAN) 3 workgroup and a service and architecture SA) 2 workgroup.

Optionally, the terminal 40 in this embodiment of this disclosure may be a device configured to display a VR video, for example, a wearable device, a VR terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, or a wireless terminal in smart home. The terminal may be mobile or fixed.

Optionally, the server 30 and the terminal 40 in this embodiment of this disclosure may also be referred to as communication apparatuses, and each may be a general-purpose device or a dedicated device. This is not limited in this embodiment of this disclosure.

Figure 3:
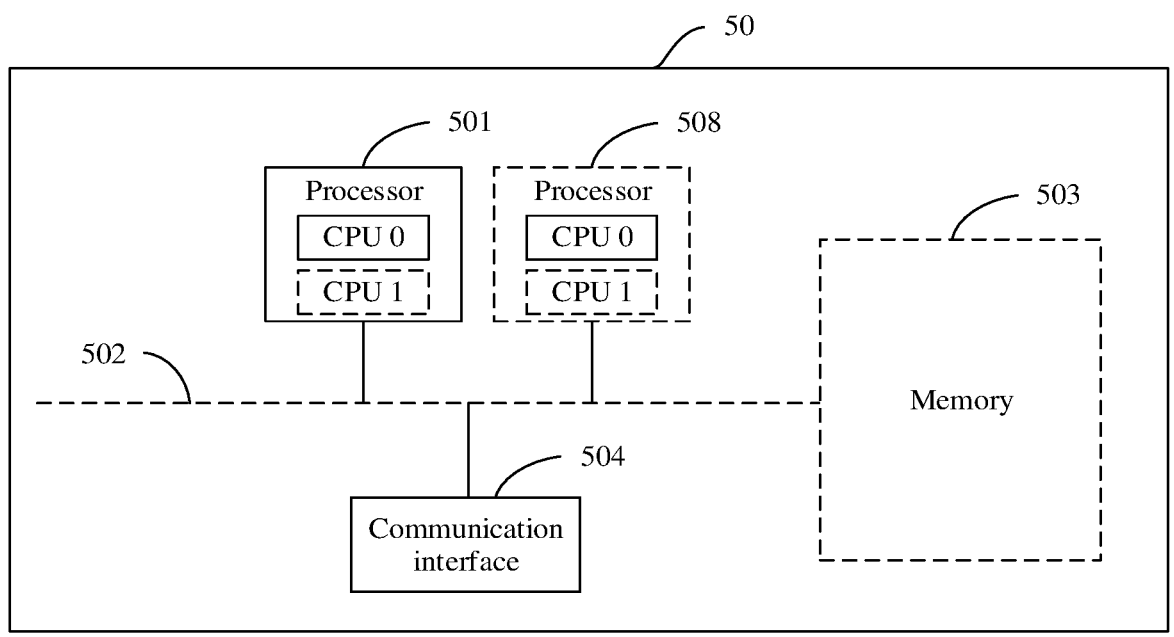
FIG. 3 is a schematic diagram of a structure of a communication device according to an embodiment of this disclosure.

Optionally, in this embodiment of this disclosure, the server 30 or the terminal 40 may be implemented by a communication device (or communication apparatus) 50 in FIG. 3.

FIG. 3 is a schematic diagram of a structure of the communication device 50 according to an embodiment of this disclosure. The communication device 50 includes one or more processors 501 and at least one communication interface (where FIG. 3 is merely an example in which a communication interface 504 and one processor 501 are included for description), and optionally may further include a memory 503 and a communication bus 502.

Optionally, the processor 501, the communication interface 504, or the memory 503 may be coupled together (not shown in FIG. 3), or as shown in FIG. 3, may be connected together through the communication bus 502.

The processor 501 may be a general-purpose central processing unit (CPU), a microprocessor, an application-specific integrated circuit (ASIC), or one or more integrated circuits configured to control program execution of the solutions of this disclosure.

The communication bus 502 may be a Peripheral Component Interconnect (PCI) bus, an Extended Industry Standard Architecture (EISA) bus, or the like. The bus may be classified into an address bus, a data bus, a control bus, and the like. For ease of representation, only one thick dashed line is used to represent the bus in FIG. 3, but this does not indicate that there is only one bus or only one type of bus. The communication bus 502 may be configured to connect different components in the communication device 50, so that the different components can communicate with each other.

The communication interface 504 may be a transceiver module configured to communicate with another device or a communication network, for example, an Ethernet, a RAN, or a wireless local area network (WLAN). For example, the transceiver module may be an apparatus such as a transceiver or a transceiver. Optionally, the communication interface 504 may alternatively be a transceiver circuit located inside the processor 501, and is configured to implement signal input and signal output of the processor.

The memory 503 may be an apparatus having a storage function. For example, the memory may be a read-only memory (ROM), another type of static storage device that can store static information and instructions, a random-access memory (RAM), or another type of dynamic storage device that can store information and instructions, or may be an electrically erasable programmable ROM (EEPROM), a compact disc (CD) ROM (CD-ROM) or another CD storage, an optical disc storage (including a CD, a laser disc, an optical disc, a DIGITAL VERSATILE DISC (DVD), a BLU-RAY disc, or the like), a magnetic disk storage medium or another magnetic storage device, or any other medium that can be configured to carry or store expected program code in a form of instructions or a data structure and that can be accessed by a computer. However, the memory is not limited thereto. The memory may exist independently, and connect to the processor through the communication line 502. The memory may alternatively be integrated with the processor.

The memory 503 is configured to store computer instructions for performing the solutions of this disclosure, and the processor 501 controls execution of the computer instructions. The processor 501 is configured to execute the computer instructions stored in the memory 503, to implement the method provided in embodiments of this disclosure.

Alternatively, optionally, in this embodiment of this disclosure, the processor 501 may perform processing-related functions in a method provided in the following embodiments of this disclosure, and the communication interface 504 is responsible for communication with another device or a communication network. This is not limited in this embodiment of this disclosure.

Optionally, the computer instructions in this embodiment of this disclosure may also be referred to as application program code. This is not limited in this embodiment of this disclosure.

During specific implementation, in an embodiment, the processor 501 may include one or more CPUs, for example, a CPU0 and a CPU1 in FIG. 3.

During specific implementation, in an embodiment, the communication device 50 may include a plurality of processors, for example, the processor 501 and a processor 508 in FIG. 3. Each of the processors may be a single-core (single-CPU) processor, or may be a multi-core (multi-CPU) processor. The processor herein may be one or more devices, circuits, and/or processing cores configured to process data (for example, computer program instructions).

It may be understood that the structure shown in FIG. 3 constitute no specific limitation on the communication apparatus. For example, in some other embodiments of this disclosure, the communication apparatus may include more or fewer components than those shown in the figure, some components may be combined, some components may be split, or the components may be differently arranged. The components shown in the figure may be implemented by hardware, software, or a combination of software and hardware.

Figure 4:
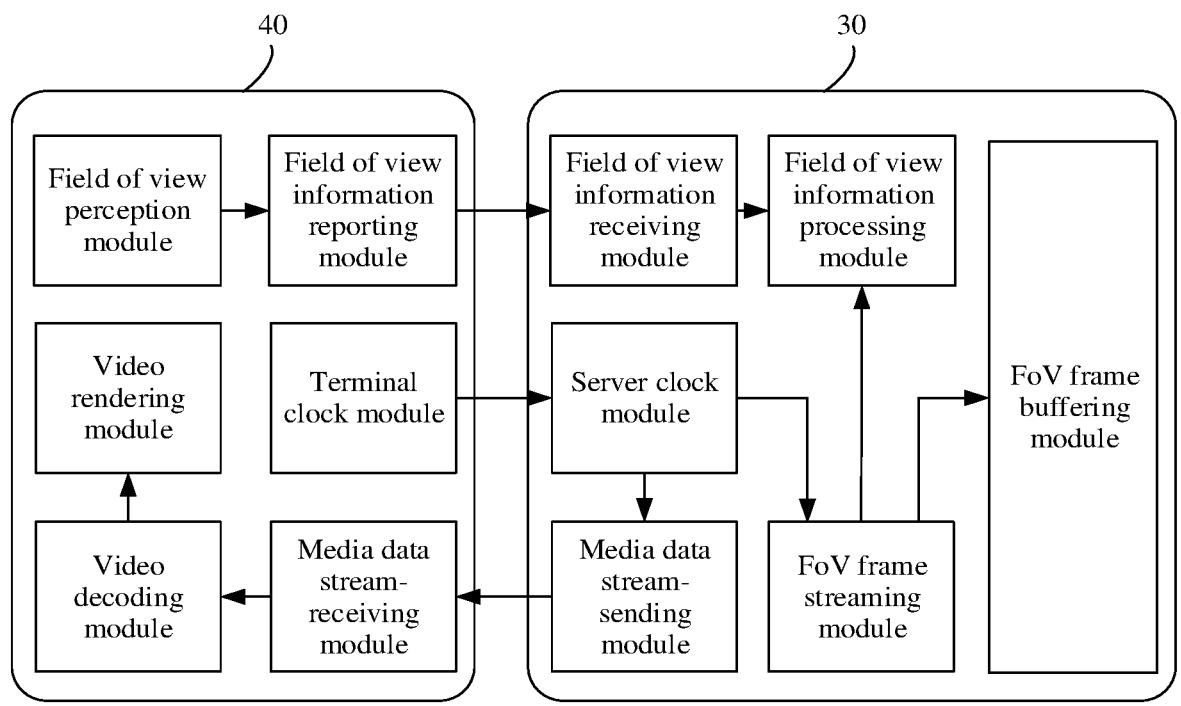
FIG. 4 is a schematic diagram of structures of a terminal and a server according to an embodiment of this disclosure.

Optionally, FIG. 4 is a structural block diagram of a server 30 and a terminal 40 according to an embodiment of this disclosure. The structural block diagram may be understood as division of the server 30 and the terminal 40 from a perspective of logical functions.

The terminal 40 includes one or more of the following modules: a field of view perception module, a field of view information reporting module, a terminal clock module, a media data stream-receiving module, a video decoding module, and a video rendering module.

It may be understood that modules of the terminal 40 may communicate with each other. FIG. 4 is merely an example of a schematic diagram of communication between modules of the terminal 40, and does not constitute any limitation.

It should be noted that a manner of communication between modules of the server 30 and the modules of the terminal 40 is not limited in this embodiment of this disclosure. FIG. 4 is merely an example of a schematic diagram of communication between the modules of the server 30 and the modules of the terminal 40, and there may be another communication manner.

Optionally, the field of view perception module is mainly configured to monitor a field of view of a user. The field of view perception module may monitor a change of a field of view caused by a head turn or another displacement of the user, and transfer the change to another module such as the field of view information reporting module of the terminal.

The field of view information reporting module is mainly configured to establish and maintain an independent long-term transmission channel (namely, a first link) with the server, and periodically report latest field of view information of the user to the server through the transmission channel based on a first period.

The terminal clock module is mainly configured to provide unified system clock and timer services for each module of the terminal, and is configured to coordinate a processing time sequence between the modules. In addition, the terminal clock module is further configured to perform clock synchronization with the server.

The media data stream-receiving module is mainly configured to establish and maintain an independent media data transmission channel (that is, a second link) with the server, and receive image data from the server through the channel based on a second period.

The video decoding module is mainly configured to decode the received image data.

The video rendering module is mainly configured to render the received image data, combine the image data with a background image, and display a combined image data.

For the server 30:

The server 30 includes one or more of the following modules: a field of view information receiving module, a field of view information processing module, a server clock module, a FoV frame buffering module, a FoV frame streaming module, and a media data stream-sending module.

It may be understood that the modules of the server 30 may communicate with each other. FIG. 4 is merely an example of a schematic diagram of communication between the modules of the server 30, and does not constitute any limitation.

Optionally, the field of view information receiving module is mainly configured to establish and maintain an independent long-term transmission channel (namely, the first link) with the terminal, receive the field of view information reported by the terminal periodically through the transmission channel based on the first period, and provide the field of view information to the field of view information processing module.

The field of view information processing module is mainly configured to process the field of view information reported by the terminal, and convert the field of view information into a unified coordinate description on the server side.

Optionally, the field of view information processing module may further include a field of view information processing logic engine module and a field of view information buffering module. The field of view information processing logic engine module is configured to process the field of view information reported by the terminal, and the field of view information buffering module is configured to buffer processed field of view information.

The server clock module is mainly configured to provide unified system clock and timer services for each module of the server, and is configured to coordinate a processing time sequence between the modules. In addition, the server clock module is further configured to receive a synchronization message from the terminal.

The FoV frame buffering module is mainly configured to buffer processed FoV frame data.

The FoV frame streaming module mainly selects a FoV frame corresponding to the field of view information based on a frame time sequence and a server clock, and encapsulates the FoV frame.

The media data stream-sending module is mainly configured to establish and maintain an independent media data transmission channel (that is, the second link) with the terminal, and send image data to the terminal through the channel based on the second period.

It may be understood that the structure shown in FIG. 4 does not constitute a specific limitation on the terminal or the server. For example, in some other embodiments of this disclosure, the terminal or the server may include more or fewer modules than those shown in the figure, some modules may be combined, some modules may be split, or the modules may be differently arranged. The modules shown in the figure may be implemented by hardware, software, or a combination of software and hardware.

It may be understood that names of the modules of the terminal or the server shown in FIG. 4 are merely examples, and other names may also be used during specific implementation. This is not limited.

The following describes in detail the video transmission method provided in embodiments of this disclosure with reference to FIG. 1 to FIG. 4.

It may be understood that actions, terms, and the like in embodiments of this disclosure may be mutually referenced. This is not limited. In embodiments of this disclosure, names of messages exchanged between devices, names of parameters in the messages, or the like are merely examples. Another name may alternatively be used during specific implementation. This is not limited.

In addition, in embodiments of this disclosure, the terminal or the server may perform some or all steps in embodiments of this disclosure. These steps or operations are merely examples. In embodiments of this disclosure, other operations or variations of various operations may be further performed. In addition, the steps may be performed in a sequence different from a sequence presented in embodiments of this disclosure, and not all operations in embodiments of this disclosure need to be performed.

Figure 5A:
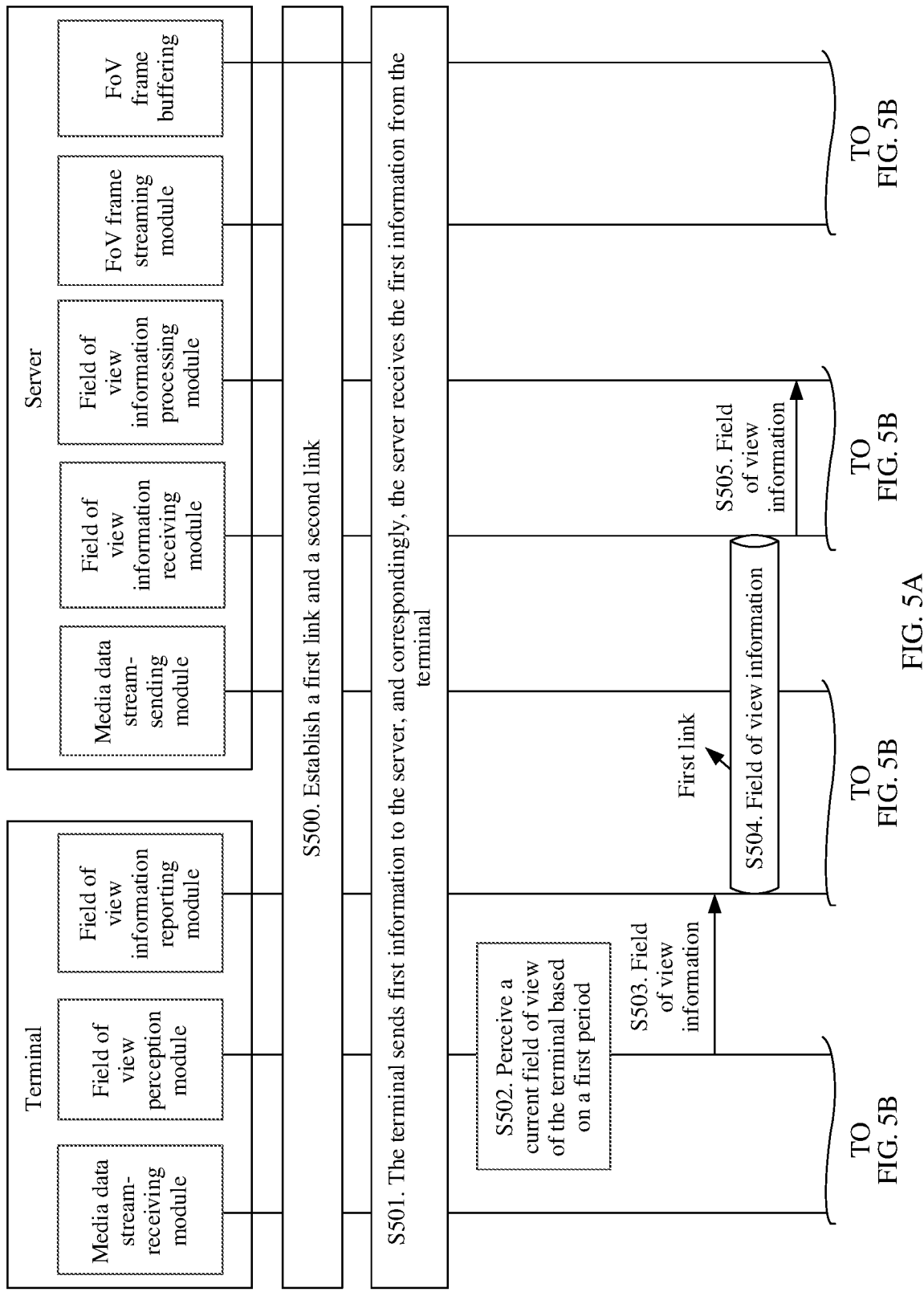
FIG. 5A and FIG. 5B are a schematic flowchart of a video transmission method according to an embodiment of this disclosure.
Figure 5B:
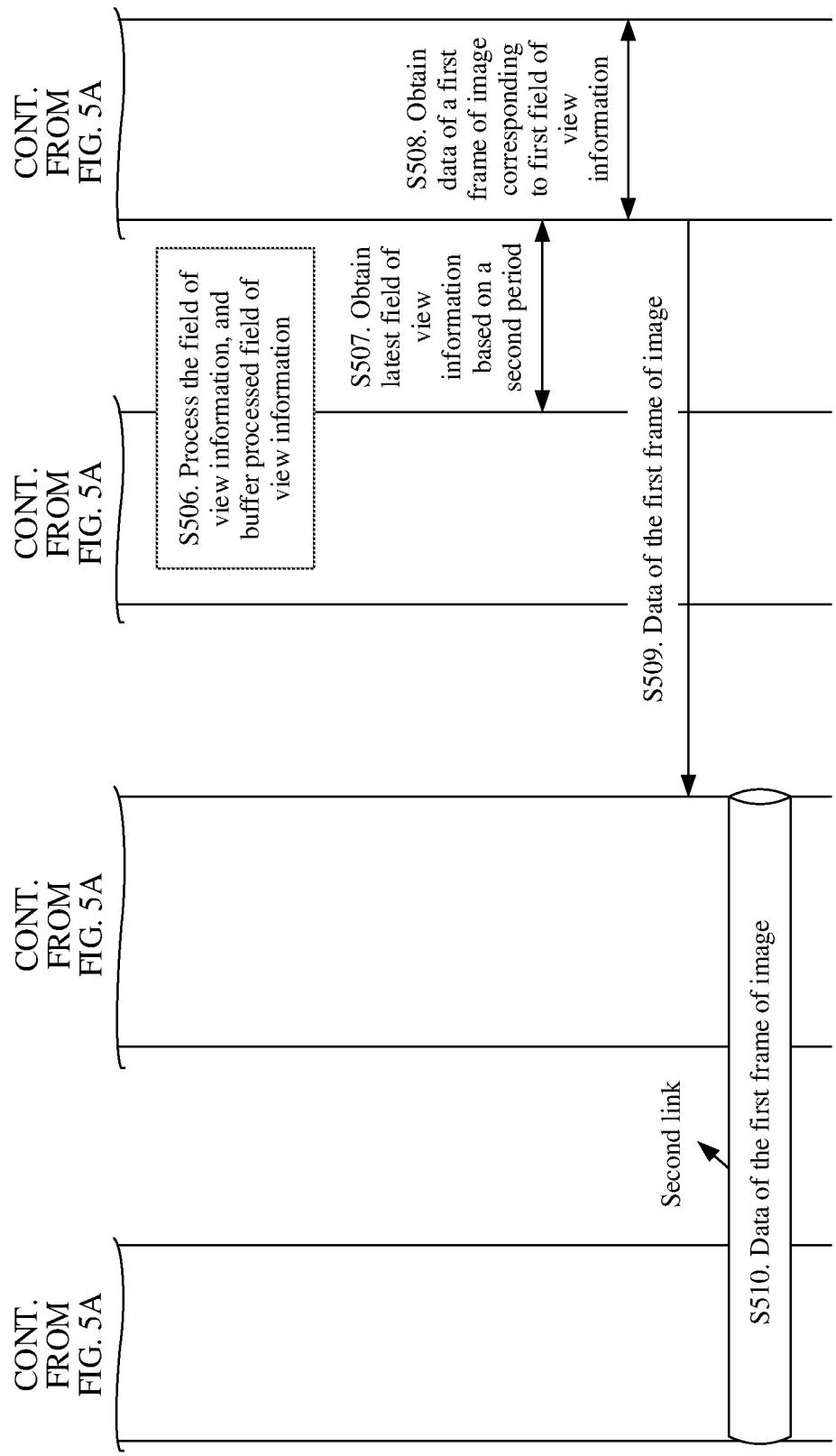

Based on the structural block diagram of the terminal or the server shown in FIG. 4, FIG. 5A and FIG. 5B show a video transmission method according to an embodiment of this disclosure. The transmission method includes the following steps.

S500. A terminal establishes a first link and a second link to a server.

The first link is for transmitting field of view information, and the second link is for transmitting a FoV frame. The first link and the second link are different links and are independent of each other. That is, data transmission on the first link and the second link does not affect each other.

Optionally, after step S500 is completed, it may be considered that the first link is established between a field of view information reporting module of the terminal and a field of view information receiving module of the server, and the second link is established between a media data stream-receiving module of the terminal and a media data stream-sending module of the server.

Optionally, step S500 may be performed when the terminal device starts to play a video.

S501. The terminal sends first information to the server. Correspondingly, the server receives the first information from the terminal.

The first information indicates a first reference moment for sending image data to the terminal, and the first reference moment is a moment at which the server sends the image data to the terminal for the first time.

Optionally, the terminal may send the first information to the terminal after the terminal completes preparation work such as establishment of the first link and the second link and can start to transmit data to the server.

Optionally, the first information may include the first reference moment.

Optionally, the "first time" in this embodiment of this disclosure may be understood as the first time for a video, instead of the first time after power-on of the terminal. For example, after the terminal is powered on, the terminal first plays a video 1 and then plays a video 2. In this case, for the video 1, the first reference moment is a moment at which the server sends image data of the video 1 to the terminal for the first time, and for the video 2, the first reference moment is a moment at which the server sends image data of the video 2 to the terminal for the first time.

Optionally, that the terminal sends the first information to the server may be understood as that the terminal initiates one time of clock synchronization to the server. After receiving the first information, the server may establish a clock instance for the terminal, and subsequently perform time sequence control and processing based on the clock instance. To be specific, in the following embodiment, a server clock module of the server may perform time sequence control based on the clock instance and a second period.

S502. A field of view perception module of the terminal perceives a current field of view of the terminal based on a first period.

Optionally, the "current field of view of the terminal" may also be understood as a "current field of view of a user who uses the terminal". This is not limited in this embodiment of this disclosure.

Optionally, a terminal clock module may activate the field of view perception module periodically based on the first period, so that the field of view perception module perceives the current field of view of the terminal based on the first period. In other words, the terminal may perceive the current field of view of the terminal based on a clock of the terminal and the first period.

Optionally, a start moment of the $1^{st}$ first period may be the first reference moment. In other words, a moment at which the terminal perceives the current field of view of the terminal for the first time may be the first reference moment. Then, the terminal periodically perceives the current field of view of the terminal based on the first reference moment and the first period.

Optionally, after perceiving the current field of view of the terminal, the field of view perception module of the terminal generates field of view information of the current field of view, that is, the field of view information is for describing the current field of view perceived by the field of view perception module.

S503. The field of view perception module of the terminal sends the field of view information to the field of view information reporting module. Correspondingly, the field of view information reporting module of the terminal receives the field of view information from the field of view perception module.

It may be understood that the field of view perception module of the terminal may send the field of view information to the field of view information reporting module after generating the field of view information of the current field of view.

S504. The field of view information reporting module of the terminal sends the field of view information to the field of view information receiving module of the server through the first link. Correspondingly, the field of view information receiving module of the server receives the field of view information from the field of view information reporting module of the terminal through the first link.

It may be understood that, after receiving the field of view information from the field of view perception module, the field of view information reporting module of the terminal may report the field of view information to the field of view information receiving module of the server through the first link. Therefore, a period for the terminal to report the field of view information to the server may be considered as the first period. In other words, the terminal may send first field of view information to the server based on the clock of the terminal and the first period.

In this embodiment of this disclosure, an example in which the field of view information reported by the terminal to the server in the first period closest to a current moment is the first field of view information is used for description.

S505. The field of view information receiving module of the server sends the field of view information to a field of view information processing module. Correspondingly, the field of view information processing module of the server receives the field of view information from the field of view information receiving module.

Optionally, after receiving the field of view information from the terminal, the field of view information receiving module of the server may send the field of view information to the field of view information processing module of the server.

S506. The field of view information processing module of the server processes the field of view information, and buffers processed field of view information.

Optionally, step S506 may include the following. A field of view information processing logic engine module included in the field of view information processing module of the server processes the field of view information, for example, converting the field of view information into unified field of view coordinates on the server side, where the field of view coordinates are the processed field of view information, and a field of view information buffering module included in the field of view information processing module of the server buffers the processed field of view information.

In this embodiment of this disclosure, it may be considered that the pre-processed field of view information and the processed field of view information is same information. The following described field of view information is further the pre-processed field of view information or the processed field of view information, and may be determined based on a scenario in which the field of view information appears. Details are not described in this embodiment of this disclosure.

S507. A FoV frame streaming module of the server obtains latest field of view information from the field of view information processing module based on the second period.

Optionally, the second period is determined based on a frame rate of a video, to be specific, the second period is a display interval between two adjacent frames of images at the frame rate. The video is a video that the terminal starts to play. For example, a frame rate at which a quantity of frames transmitted per second (FPS) is 30 frames (that is, 30 FPS) is used as an example, and the second period is 33 milliseconds (ms).

Optionally, the second period and the first period may be the same, or may be different. When the two periods are different, a relationship between sizes of the second period and the first period is not limited in this embodiment of this disclosure.

Optionally, the server clock module of the server may activate the FoV frame streaming module periodically based on the second period, so that the FoV frame streaming module obtains the latest field of view information based on the second period.

Optionally, the FoV frame streaming module may determine field of view information buffered by the field of view information processing module at a moment closest to the current moment as the latest field of view information.

In this embodiment of this disclosure, because the field of view information reported by the terminal at a moment closest to the current moment is the first field of view information, the FoV frame streaming module of the server determines, based on the second period, that the latest field of view information buffered by the field of view information processing module is the first field of view information, that is, the server may determine, based on the second period, that the first field of view information is the latest field of view information.

Optionally, a start moment of the 1$^{st}$ second period may be the first reference moment. In other words, a moment at which the server obtains the latest field of view information for the first time may be the first reference moment. Then, latest field of view information is obtained based on the first reference moment and the second period. To be specific, that the server determines, based on the second period, that the first field of view information is the latest field of view information may include the following. The server determines, based on a clock of the server and the second period, that the first field of view information is the latest field of view information.

S508. The FoV frame streaming module of the server obtains, from a FoV frame buffer, data of a first frame of image corresponding to the first field of view information.

That is, the FoV frame streaming module of the server obtains, from the FoV frame buffer, data of a frame of image corresponding to latest field of view information.

Optionally, after obtaining data of the frame of image corresponding to the latest field of view information, the FoV frame streaming module of the server may re-encapsulate the data of the frame of image, and encapsulate the data in a FoV frame stream.

It may be understood that after obtaining the latest field of view information, the FoV frame streaming module of the server may obtain the data of the frame of image corresponding to the latest field of view information. Therefore, it may be considered that a period in which the server obtains data of a frame of image corresponding to latest field of view information is also the second period.

S509. The FoV frame streaming module of the server sends the data of the first frame of image to the media data stream-sending module. Correspondingly, the media data stream-sending module of the server receives the data of the first frame of image from the FoV frame streaming module.

That is, the FoV frame streaming module of the server sends, to the media data stream-sending module, the data of the frame of image corresponding to the latest field of view information.

It may be understood that, after obtaining the data of the frame of image corresponding to the latest field of view information, the FoV frame streaming module of the server may send the data of the image to the media data stream-sending module. Therefore, it may be considered that a period in which the media data stream-sending module of the server receives data of a frame of image corresponding to latest field of view information is also the second period.

S510. The media data stream-sending module of the server sends the data of the first frame of image to the media data stream-receiving module of the terminal through the second link. Correspondingly, the media data stream-receiving module of the terminal receives the data of the first frame of image from the media data stream-sending module of the server through the second link.

That is, the media data stream-sending module of the server sends, to the media data stream-receiving module of the terminal, the data of the frame of image corresponding to the latest field of view information.

Optionally, after receiving the data of the first frame of image, the media data stream-receiving module of the terminal may buffer the first frame of image, and subsequently send, according to a processing time sequence of the terminal, the first frame of image to a video decoding module for decoding. After decoding, the video decoding module transmits the first frame of image to a video rendering module for rendering, to finally display the first frame of image.

Optionally, after receiving the data of the first frame of image, the media data stream-sending module of the server may send the data of the first frame of image to the terminal. Therefore, it may be considered that a period in which the server sends data of a frame of image corresponding to latest field of view information is also the second period. Alternatively, the server clock module of the server may periodically activate the media data stream-sending module based on the second period, so that the media data stream-sending module sends data of a frame of image corresponding to latest field of view information to the terminal based on the second period.

Accordingly, because the server sends data of a frame of image based on the second period, it may be considered that the terminal receives the data of the frame of image based on the second period.

In conclusion, in this embodiment of this disclosure, the terminal reports the field of view information to the server based on the first period. After receiving the field of view information, the server does not immediately obtain an image corresponding to the field of view information, but obtains, based on the second period, latest field of view information considered by the server, and then sends data of a frame of image corresponding to latest field of view information to the terminal. Therefore, in general, in this embodiment of this disclosure, the server sends video data to the terminal frame by frame.

Based on the solution in this embodiment of this disclosure, the server obtains, based on the second period, the latest field of view information reported by the terminal and the data of the frame of image corresponding to the latest field of view information, that is, time for generating and sending image data on the server side is independently controlled by the server. In addition, each time the server generates and sends data of a frame of image corresponding to latest field of view information, a transmission granularity can be reduced to an image frame level, to more precisely control processing and sending time of each frame of image, reduce generation and transmission of redundant data, and further reduce a transmission burst bandwidth. In addition, the terminal reports the field of view information through the first link, and the server sends the image data through the second link. Therefore, an independent link is for reporting the field of view information, and sending and receiving of the image data are not affected. When image data corresponding to new field of view information is transmitted, a transmission link does not need to be re-established, to reduce an MTHR.

It may be understood that when a structure of the terminal or the server is not the structure shown in FIG. 4, the video transmission method provided in this embodiment of this disclosure is still applicable. To be specific, the terminal can still implement functions/implementation processes implemented by the modules of the terminal shown in FIG. 5A and FIG. 5B, and the server can still implement functions/implementation processes implemented by the modules of the server shown in FIG. 5A and FIG. 5B.

The following describes, by using a specific example, application of the video transmission method shown in FIG. 5A and FIG. 5B.

For example, the terminal plays a video 1, and the first reference moment is 15 o'clock. Assuming that the first period is 10 ms, and a frame rate of the video 1 is 30 FPS, that is, the second period is 33 ms, processing time sequences of the terminal and the server may be shown in FIG. 6. To be specific, the terminal reports field of view information to the server every 10 ms starting from 15 o'clock, and the server obtains latest field of view information and data of a frame of image corresponding to the latest field of view information every 33 ms starting from 15 o'clock, and sends the latest field of view information and the data to the terminal.

Figure 6:
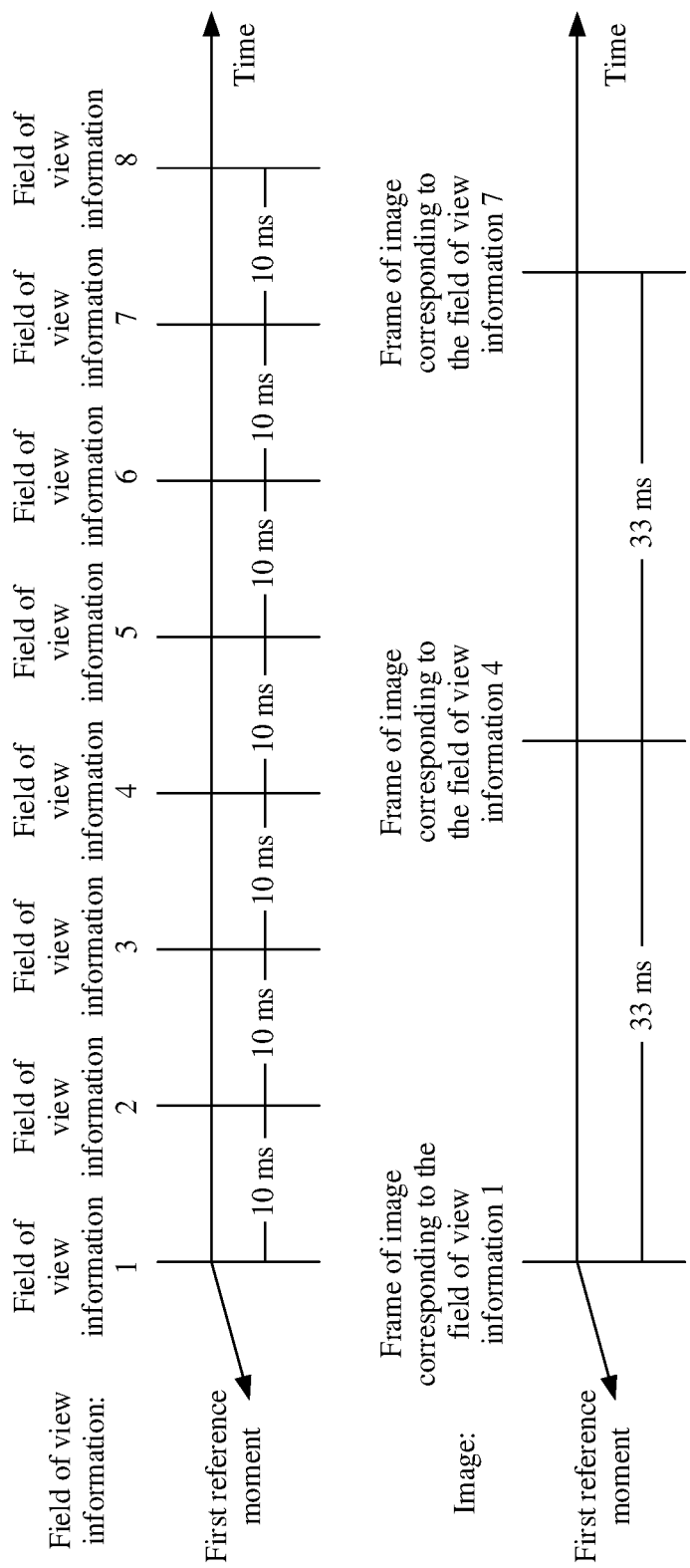
FIG. 6 is a schematic diagram of processing time sequences of a terminal and a server according to an embodiment of this disclosure.

As shown in FIG. 6, latest field of view information obtained by the server for the first time is field of view information 1, latest field of view information obtained for the second time is field of view information 4, and latest field of view information obtained for the third time is field of view information 7. In other words, the server sends, to the terminal based on the second period, data of frames of images corresponding to the field of view information 1, the field of view information 4, and the field of view information 7 respectively.

It may be understood that, in this scenario, when the server sends, to the terminal, the frame of image corresponding to the field of view information 1, even if the server sends, to the terminal 10 ms after sending the frame of image corresponding to the field of view information 1, the frame of image corresponding to the field of view information 2, because a display interval between the two frames of images is 33 ms, the terminal cannot display the frame of image corresponding to the field of view information 2. Therefore, frame skipping usually does not occur when the server sends, based on the second period, a frame of image corresponding to latest field of view information. In this way, user experience is not affected.

Alternatively, for example, the terminal plays a video 1, and the first reference moment is 15 o'clock. Assuming that the first period is 40 ms, and a frame rate of the video 1 is 30 FPS, that is, the second period is 33 ms, processing time sequences of the terminal and the server may be shown in FIG. 7. To be specific, the terminal reports field of view information to the server every 40 ms starting from 15 o'clock, and the server obtains latest field of view information and data of a frame of image corresponding to the latest field of view information every 33 ms starting from 15 o'clock, and sends the latest field of view information and the data to the terminal.

Figure 7:
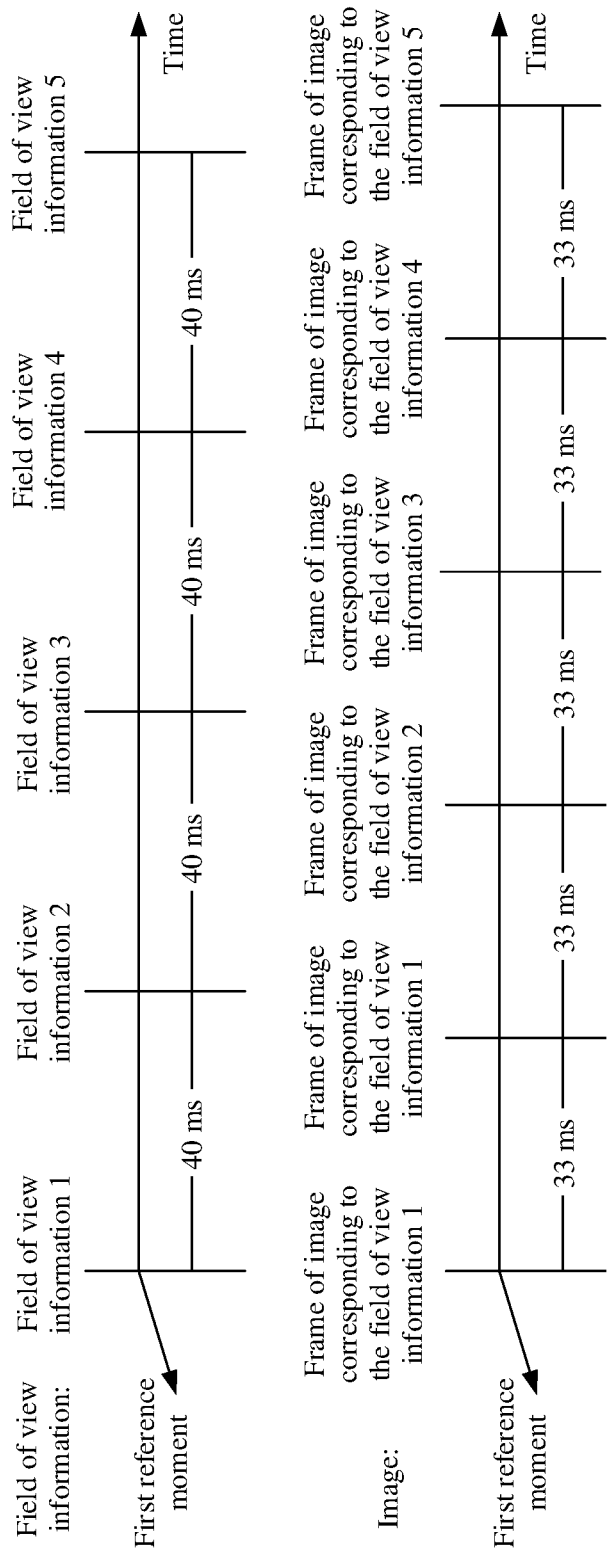
FIG. 7 is another schematic diagram of processing time sequences of a terminal and a server according to an embodiment of this disclosure.

As shown in FIG. 7, latest field of view information obtained by the server for the first time is field of view information 1, latest field of view information obtained for the second time is the field of view information 1, latest field of view information obtained for the third time is field of view information 2, latest field of view information obtained for the fourth time is field of view information 3, latest field of view information obtained for the fifth time is field of view information 4, and latest field of view information obtained for the sixth time is field of view information 5. In other words, the server separately sends, to the terminal at different moments based on the second period, data of a frame of image corresponding to the field of view information 1 twice and data of a frame of image corresponding to each of the field of view information 2, the field of view information 3, the field of view information 4, and the field of view information 5.

It may be understood that, in this scenario, after receiving field of view information even if the server does not immediately obtain and send a frame of image corresponding to the field of view information, because the server performs processing at a granularity of a frame, generation of redundant data is greatly reduced, and time for transmitting image data corresponding to old field of view information in a network is short. Therefore, time required for transmitting image data corresponding to new field of view information is short. Overall, an MTHR can still be reduced in the solution in this embodiment of this disclosure.

It may be understood that the scenario shown in FIG. 7 is merely intended to describe the solutions in embodiments of this disclosure more clearly. In actual application, to ensure terminal sensitivity and user experience, the first period is not excessively long, and is generally from 10 ms to 20 ms.

Figure 8A:
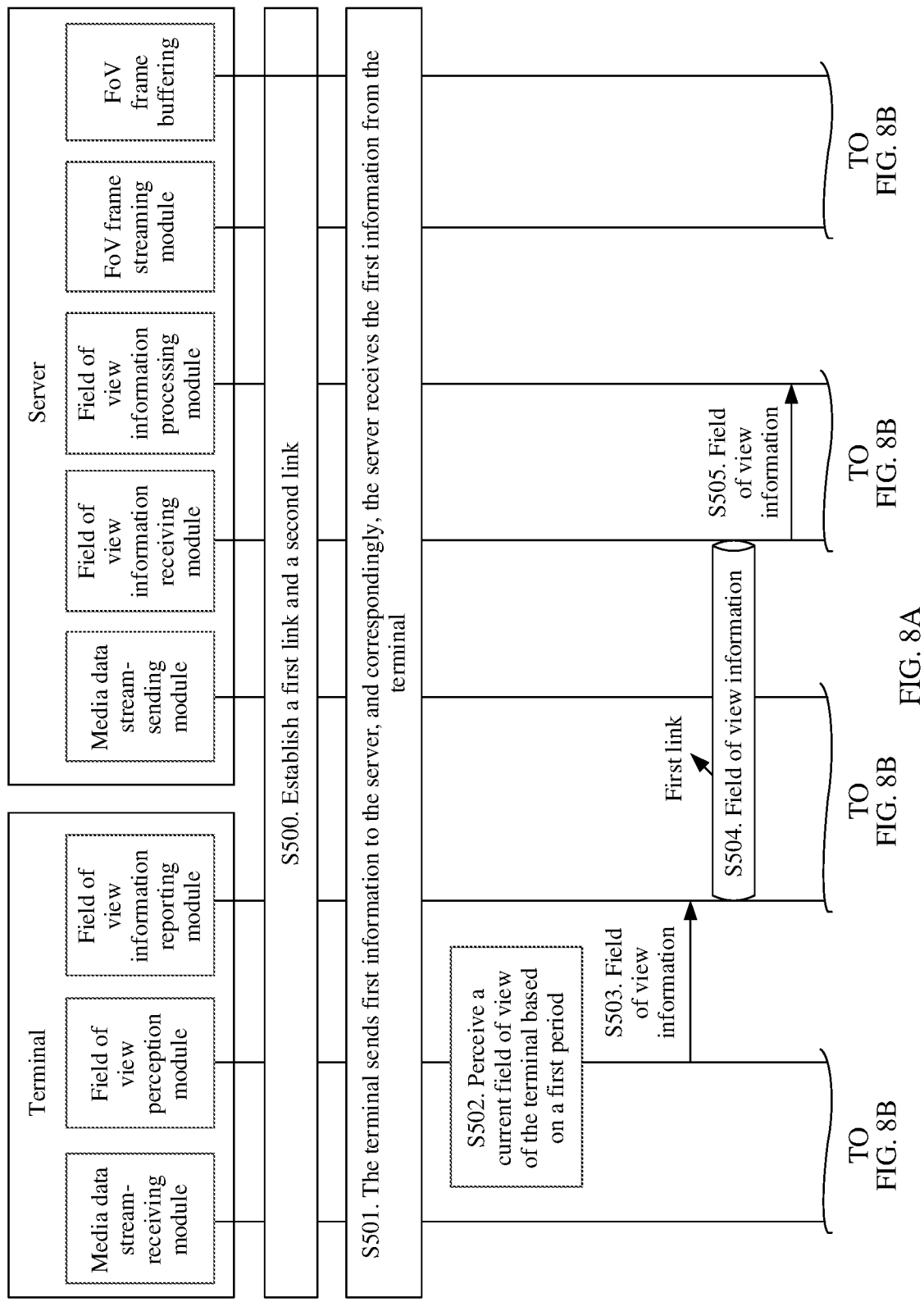
FIG. 8A and FIG. 8B are a schematic flowchart of another video transmission method according to an embodiment of this disclosure.
Figure 8B:
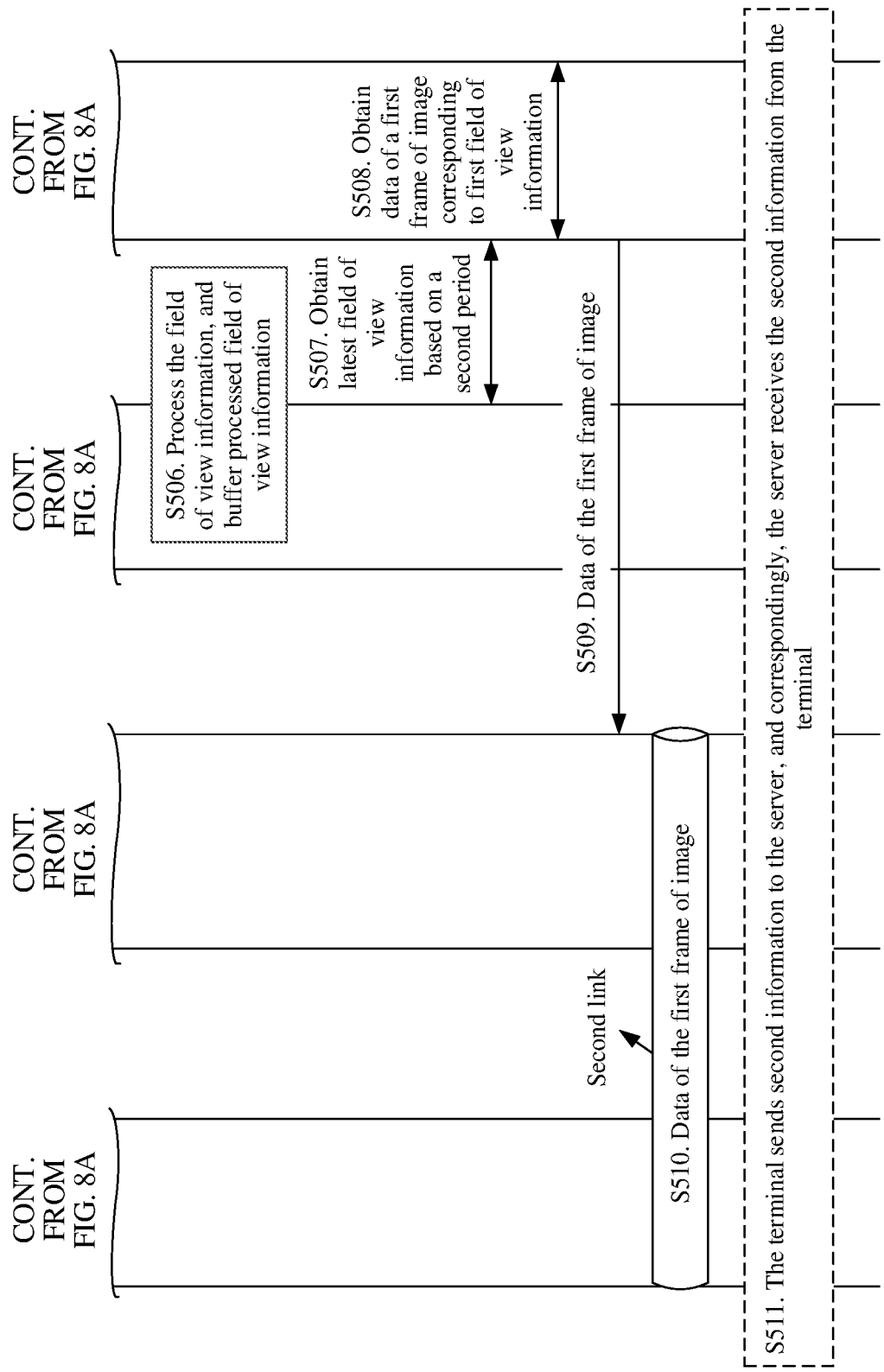

Optionally, in an implementation scenario of this embodiment of this disclosure, as shown in FIG. 8A and FIG. 8B, the video transmission method may further include the following step.

S511. The terminal sends second information to the server. Correspondingly, the server receives the second information from the terminal.

Optionally, the terminal may periodically determine a quantity of frames of an image buffered by the terminal, and send the second information to the server based on the quantity of frames of the image.

In a possible implementation, when the quantity of frames of the image buffered by the terminal is greater than or equal to a first threshold, the terminal sends the second information to the server, where the second information indicates to send data of a second frame of image at a second reference moment, the second reference moment is later than a first moment, the first moment is a moment at which the second frame of image is sent based on the second period by using the first reference moment as a start moment, and the second frame of image is a next frame of image to be received by the terminal. Alternatively, the first moment is a moment at which the second frame of image is sent based on the second period that uses the first reference moment as a start moment. That is, the server delays sending the second frame of image.

Optionally, reasons why the quantity of frames of the image buffered by the terminal is greater than or equal to the first threshold may be that network quality is good and a transmission delay is low. In this case, if the server sends image data based on the second period by using the first reference moment as the start moment, the terminal may buffer excessive image data. In this case, the terminal may send the second information to the server, to indicate the server to send the second frame of image at the second reference moment, where the second reference moment is later than the first moment.

For example, if the first threshold is 2, image frames buffered by the terminal are the $38^{th}$ frame and the $39^{th}$ frame, and the first reference moment is 15 o'clock, a frame number of the second frame of image is 40. It is assumed that the first reference moment is used as a start moment, and a moment (that is, the first moment) at which the second frame of image is sent based on the second period is 16 o'clock. In this case, the second reference moment is later than 16 o'clock. For example, the second reference moment may be 16:01.

In another possible implementation, when the quantity of frames of the image buffered by the terminal is less than or equal to a second threshold, the terminal sends the second information to the server, where the second information indicates to send data of a second frame of image at a second reference moment, the second reference moment is earlier than a first moment, the first moment is a moment at which the second frame of image is sent based on the second period by using the first reference moment as a start moment, and the second frame of image is a next frame of image to be received by the terminal. Alternatively, the first moment is a moment at which the second frame of image is sent based on the second period that uses the first reference moment as a start moment. That is, the server sends the second frame of image in advance.

Optionally, reasons why the quantity of frames of the image buffered by the terminal is less than or equal to the second threshold may be that network quality is poor and a transmission delay is high. In this case, if the server sends image data based on the second period by using the first reference moment as the start moment, frame freezing or erratic display may occur when the terminal plays a video, affecting user experience. In this case, the terminal may send the second information to the server, to indicate the server to send the second frame of image at the second reference moment, where the second reference moment is earlier than the first moment.

For example, if the second threshold is 1, an image frame buffered by the terminal is the $38^1$ frame, and the first reference moment is 15 o'clock, a frame number of the second frame of image is 39. It is assumed that the first reference moment is used as a start moment, and a moment (that is, the first moment) at which the second frame of image is sent based on the second period is 16 o'clock. In this case, the second reference moment is earlier than 16 o'clock. For example, the second reference moment may be 15:59.

Optionally, in the foregoing two implementations, the second information may include the frame number of the second frame of image. In this case, the server may determine a moment at which the second information is received as the second reference moment, and obtain and send the data of the second frame of image at the second reference moment. Alternatively, the second information may include the second reference moment. In this case, the server may determine a next frame of image to be received by the terminal as a next frame of image to be sent by the server, and obtain and send the data of the second frame of image at the second reference moment. Alternatively, the second information may include the second reference moment and the frame number of the second frame of image. In this case, the server may send the data of the second frame of image at the second reference moment indicated by the second information.

Optionally, in the foregoing two implementations, after sending the data of the second frame of image at the second reference moment, the server may continue to obtain and send image data based on the second period by using the second reference moment as a start moment.

Optionally, that the terminal sends the second information to the server may be understood as that the terminal initiates another time of clock synchronization to the server.

Based on the solution, the terminal can dynamically adjust, in real time by perceiving a change of the quantity of image frames buffered by the terminal, time for sending image data by the server. On one hand, the terminal may be prevented from buffering an excessively large amount of image data, and a redundant data amount in a transmission process can be reduced, to reduce a transmission burst bandwidth when a user's field of view changes (for example, the user turns the head). On the other hand, this can effectively alleviate a problem of transmission instability caused by a network condition change, especially a transmission delay jitter, improve transmission stability, and improve user experience.

In embodiments of this disclosure, unless otherwise stated or there is a logic conflict, terms and/or descriptions between different embodiments are consistent and may be mutually referenced, and technical features in different embodiments may be combined based on an internal logical relationship thereof, to form a new embodiment.

It may be understood that, in the foregoing embodiments, methods and/or steps implemented by the server may also be implemented by a component (for example, a chip or a circuit) that can be used in the server, and methods and/or steps implemented by the terminal may also be implemented by a component (for example, a chip or a circuit) that can be used in the terminal.

The foregoing mainly describes, from a perspective of interaction between devices, the solutions provided in embodiments of this disclosure. Correspondingly, embodiments of this disclosure further provide a communication apparatus, and the communication apparatus is configured to implement the foregoing various methods. The communication apparatus may be the terminal in the foregoing method embodiments, an apparatus including the foregoing terminal, or a component that can be used in the terminal. Alternatively, the communication apparatus may be the server in the foregoing method embodiments, an apparatus including the foregoing server, or a component that can be used in the server. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In embodiments of this disclosure, the communication apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software functional module. It should be noted that, in embodiments of this disclosure, module division is an example, and is merely a logical function division. In actual implementation, another division manner may be used.

Figure 9:
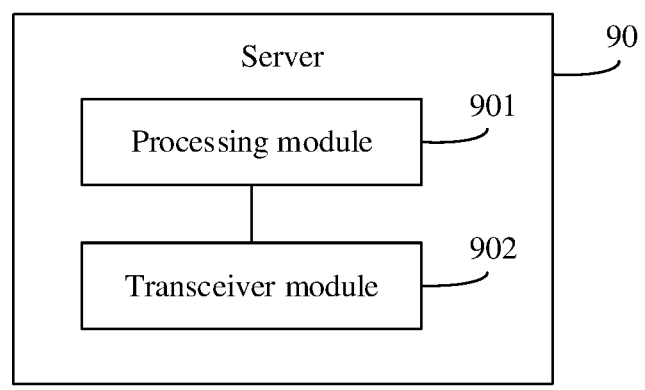
FIG. 9 is a schematic diagram of a structure of another server according to an embodiment of this disclosure.

For example, the communication apparatus is the server in the foregoing method embodiments. FIG. 9 is a schematic diagram of a structure of a server 90. The server 90 includes a processing module 901 and a transceiver module 902. The transceiver module 902 may also be referred to as a transceiver unit for implementing a sending and/or receiving function, and may be, for example, a transceiver circuit, a transceiver machine, a transceiver, or a communication interface.

The transceiver module 902 is configured to receive first field of view information from a terminal through a first link based on a first period. The processing module 901 is configured to determine, based on a second period, that the first field of view information is latest field of view information. The processing module 901 is further configured to obtain data of a first frame of image corresponding to the first field of view information. The transceiver module 902 is further configured to send the data of the first frame of image to the terminal through a second link.

Optionally, that the processing module 901 is configured to determine, based on a second period, that the first field of view information is latest field of view information may include the following. The processing module 901 is configured to determine, based on a clock of the server and the second period, that the first field of view information is the latest field of view information.

Optionally, the transceiver module 902 is further configured to receive first information from the terminal, where the first information indicates a first reference moment for sending image data to the terminal, and the first reference moment is a moment at which the server sends the image data to the terminal for the first time.

Optionally, the transceiver module 902 is further configured to receive second information from the terminal, where the second information indicates to send data of a second frame of image at a second reference moment, the second frame of image is a next frame of image to be received by the terminal, the second reference moment is later than a first moment or the second reference moment is earlier than the first moment, and the first moment is a moment at which the second frame of image is sent based on the second period that uses the first reference moment as a start moment.

All related content of the steps in the foregoing method embodiments may be cited in function descriptions of the corresponding functional modules. Details are not described herein again.

Optionally, the server 90 may further include a storage module (not shown in FIG. 9) configured to store data and/or instructions. The processing module 901 may read the data or the instructions in the storage module, to implement the methods corresponding to the foregoing embodiments.

It may be understood that the foregoing modules may be independently disposed, or may be integrated. This is not limited in this embodiment of this disclosure.

In a possible implementation, the server 90 is presented in an integrated form of function modules obtained through division. The "module" herein may be an ASIC, a circuit, a processor that executes one or more software or firmware programs, a memory, an integrated logic circuit, and/or another component capable of providing the foregoing functions. In a simple embodiment, a person skilled in the art can figure out that the form of the communication device 50 shown in FIG. 3 may be used for the server 90.

For example, the processor 501 in the communication device 50 shown in FIG. 3 may invoke the computer-executable instructions stored in the memory 503, to enable the communication device 50 to perform the video transmission methods in the foregoing method embodiments.

Further, functions/implementation processes of the processing module 901 and the transceiver module 902 in FIG. 9 may be implemented by the processor 501 in the communication device 50 shown in FIG. 3 by invoking the computer-executable instructions stored in the memory 503. Alternatively, a function/an implementation process of the processing module 901 in FIG. 9 may be implemented by the processor 501 in the communication device 50 shown in FIG. 5 by invoking the computer-executable instruction stored in the memory 503, and a function/an implementation process of the transceiver module 902 in FIG. 9 may be implemented by using the communication interface 504 in the communication device 50 shown in FIG. 3.

Because the server 90 provided in this embodiment may perform the foregoing video transmission method, for a technical effect that can be achieved by the server, refer to the foregoing method embodiments. Details are not described herein again.

Figure 10:
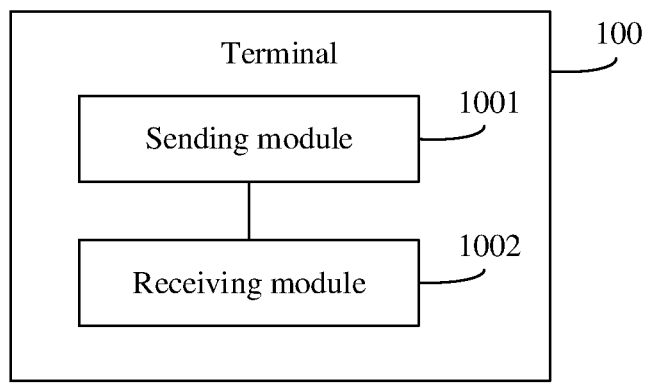
FIG. 10 is a schematic diagram of a structure of another terminal according to an embodiment of this disclosure.

Alternatively, for example, the communication apparatus is the terminal the foregoing method embodiments. FIG. 10 is a schematic diagram of a structure of a terminal 100. The terminal 100 includes a sending module 1001 and a receiving module 1002. The sending module 1001 may also be referred to as a sending unit for implementing a sending function, and the receiving module 1002 may also be referred to as a receiving unit for implementing a receiving function. The sending module 1001 and the receiving module 1002 each may be, for example, a transceiver circuit, a transceiver machine, a transceiver, or a communication interface.

The sending module 1001 is configured to send first field of view information to a server through a first link based on a first period. The receiving module 1002 is configured to receive, from the server through a second link based on a second period, data of a first frame of image that corresponds to the first field of view information.

Optionally, that the sending module 1001 is configured to send first field of view information to a server through a first link based on a first period may include the following. The sending module 1001 is configured to send the first field of view information to the server through the first link based on a clock of the terminal and the first period.

Optionally, the sending module 1001 is further configured to send first information to the server, where the first information indicates a first reference moment for sending image data to the terminal, and the first reference moment is a moment at which the server sends the image data to the terminal for the first time.

Optionally, the sending module 1001 is further configured to send second information to the server when a quantity of frames of an image buffered by the terminal is greater than or equal to a first threshold, where the second information indicates to send data of a second frame of image at a second reference moment, the second reference moment is later than a first moment, the first moment is a moment at which the second frame of image is sent based on the second period that uses the first reference moment as a start moment, and the second frame of image is a next frame of image to be received by the terminal.

Optionally, the sending module 1001 is further configured to send second information to the server when a quantity of frames of an image buffered by the terminal is less than or equal to a second threshold, where the second information indicates to send data of a second frame of image at a second reference moment, the second reference moment is earlier than a first moment, the first moment is a moment at which the second frame of image is sent based on the second period that uses the first reference moment as a start moment, and the second frame of image is a next frame of image to be received by the terminal.

All related content of the steps in the foregoing method embodiments may be cited in function descriptions of the corresponding functional modules. Details are not described herein again.

Optionally, the terminal may further include a processing module and a storage module (not shown in FIG. 10). The storage module is configured to store data and/or instructions. The processing module may read the data or the instructions in the storage module, to implement the methods corresponding to the foregoing embodiments.

It may be understood that the foregoing modules may be independently disposed, or may be integrated. This is not limited in this embodiment of this disclosure.

In a possible implementation, the terminal 100 is presented in an integrated form of function modules obtained through division. The "module" herein may be an ASIC, a circuit, a processor that executes one or more software or firmware programs, a memory, an integrated logic circuit, and/or another component capable of providing the foregoing functions. In a simple embodiment, a person skilled in the art can figure out that the form of the communication device 50 shown in FIG. 3 may be used for the terminal 100.

For example, the processor 501 in the communication device 50 shown in FIG. 3 may invoke the computer-executable instructions stored in the memory 503, to enable the communication device 50 to perform the video transmission methods in the foregoing method embodiments.

Further, functions/implementation processes of the sending module 1001 and the receiving module 1002 in FIG. 10 may be implemented by the processor 501 in the communication device 50 shown in FIG. 3 by invoking the computer-executable instructions stored in the memory 503. Alternatively, functions/implementation processes of the sending module 1001 and the receiving module 1002 in FIG. 10 may be implemented by the communication interface 504 in the communication device 50 shown in FIG. 3.

Because the terminal 100 provided in this embodiment may perform the foregoing video transmission method, for a technical effect that can be achieved by the server, refer to the foregoing method embodiments. Details are not described herein again.

Optionally, an embodiment of this disclosure further provides a communication apparatus (for example, the communication apparatus may be a chip or a chip system). The communication apparatus includes a processor configured to implement the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory. In another possible design, the communication apparatus further includes an interface circuit. The interface circuit is a code/data read/write interface circuit, and the interface circuit is configured to receive computer-executable instructions (where the computer-executable instructions are stored in a memory, may be directly read from the memory, or may be read by using another component), and transmit the computer-executable instructions to the processor. When the communication apparatus is a chip system, the communication apparatus may include a chip, or may include a chip and another discrete component. This is not limited in this embodiment of this disclosure.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this disclosure are all or partially generated. The computer may be a general-purpose computer, a dedicated computer, a computer network, or other programmable apparatuses.

The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In embodiments of this disclosure, the computer may include the apparatuses described above.

Although this disclosure is described with reference to embodiments, in a process of implementing this disclosure that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this disclosure is described with reference to specific features and embodiments thereof, it is clear that various modifications and combinations may be made to them without departing from the spirit and scope of this disclosure. Correspondingly, the specification and accompanying drawings are merely example description of this disclosure defined by the accompanying claims, and are considered as any of or all modifications, variations, combinations or equivalents that cover the scope of this disclosure. It is clearly that a person skilled in the art can make various modifications and variations to this disclosure without departing from the spirit and scope of this disclosure. This disclosure is intended to cover these modifications and variations of this disclosure provided that they fall within the scope of protection defined by the following claims and their equivalent technologies.

What is claimed is:

1. A method implemented by a terminal, wherein the method comprises:

sending, to a server through a first link based on a first period, first field of view information; and receiving, from the server through a second link based on a second period, data of a first frame of a first image that corresponds to the first field of view information, wherein the second period is based on a frame rate of a video, and wherein the first frame of the first image belongs to the video.

2. The method of claim 1, wherein sending the first field of view information comprises sending, to the server through the first link based on a clock of the terminal, the first field of view information.

3. The method of claim 1, further comprising sending, to the server, first information indicating a first reference moment at which the server is to send image data to the terminal for a first time.

4. The method of claim 3, further comprising sending, to the server, second information indicating to send data of a second frame of the first image at a second reference moment when a quantity of frames of a second image buffered by the terminal is greater than or equal to a threshold, wherein the second reference moment is later than a first moment, wherein the first moment is when the second frame is sent based on the second period that uses the first reference moment as a start moment, and wherein the second frame is a next frame of the first image to be received by the terminal.

5. The method of claim 4, wherein the second information comprises the second reference moment and a frame number of the second frame.

6. The method of claim 4, wherein the second information comprises the second reference moment or a frame number of the second frame.

7. The method of claim 3, further comprising sending, to the server, second information indicating to send data of a second frame of the first image at a second reference moment when a quantity of frames of a second image buffered by the terminal is less than or equal to a threshold, wherein the second reference moment is earlier than a first moment, wherein the first moment is when the second frame is sent based on the second period that uses the first reference moment as a start moment, and wherein the second frame is a next frame of the first image to be received by the terminal.

8. The method of claim 7, wherein the second information comprises the second reference moment and a frame number of the second frame.

9. The method of claim 7, wherein the second information comprises the second reference moment or a frame number of the second frame.

10. A terminal comprising:
   a transmitter configured to send, to a server through a first link based on a first period, first field of view information; and
   a receiver coupled to the transmitter and configured to receive, from the server through a second link based on a second period, data of a first frame of a first image that corresponds to the first field of view information,
   wherein the second period is based on a frame rate of a video, and
   wherein the first frame of the first image belongs to the video.

11. The terminal of claim 10, further comprising a clock coupled to the transmitter, wherein the transmitter is further configured to further send, to the server through the first link based on the clock, the first field of view information.

12. The terminal of claim 10, wherein the transmitter is further configured to send, to the server, first information indicating a first reference moment at which the server is to send image data to the terminal for a first time.

13. The terminal of claim 12, wherein, the transmitter is further configured to send, to the server, second information indicating to send data of a second frame of the first image at a second reference moment when a quantity of frames of a second image buffered by the terminal is greater than or equal to a threshold, wherein the second reference moment is later than a first moment, wherein the first moment is when the second frame is sent based on the second period that uses the first reference moment as a start moment, and wherein the second frame is a next frame of the first image to be received by the terminal.

14. The terminal of claim 13, wherein the second information comprises the second reference moment and a frame number of the second frame.

15. The terminal of claim 13, wherein the second information comprises the second reference moment or a frame number of the second frame.

16. The terminal of claim 12, wherein the transmitter is further configured to send, to the server, second information indicating to send data of a second frame of the first image at a second reference moment when a quantity of frames of a second image buffered by the terminal is less than or equal to a threshold, wherein the second reference moment is earlier than a first moment, wherein the first moment is when the second frame is sent based on the second period that uses the first reference moment as a start moment, and wherein the second frame is a next frame of the first image to be received by the terminal.

17. The terminal of claim 16, wherein the second information comprises the second reference moment and a frame number of the second frame.

18. The terminal of claim 16, wherein the second information comprises the second reference moment or a frame number of the second frame.

19. A communication system comprising:
   a server configured to:
      determine, based on a second period, that first field of view information is latest field of view information;
      obtain data of a first frame of image corresponding to the first field of view information, wherein the second period is based on a frame rate of a video, and wherein the first frame of the first image belongs to the video; and
      send the data of the first frame of image through a second link; and
   a terminal coupled to the server and configured to:
      send, to the server through a first link based on a first period, the first field of view information; and
      receive, from the server through the second link based on the second period, the data of the first frame of image.

20. The communication system of claim 19, wherein the terminal is further configured to send, to the server through the first link based on a clock of the terminal, the first field of view information.

* * * * *